United States Patent

Charier et al.

Patent Number: 5,440,874
Date of Patent: Aug. 15, 1995

[54] TURBO-ENGINE PROVIDED WITH A DEVICE FOR BLOWING AIR ONTO A ROTOR ELEMENT

[75] Inventors: Gilles A. Charier, La Grande Paroisse; Xavier, J. M. A. Guyonnet, St Fargeau Ponthierry; Jean-Louis Picard, Vaux le Penil, all of France

[73] Assignee: Societe Nationale d'Etude et de Construction de Moteurs d'Aviation "SNECMA", Paris, France

[21] Appl. No.: 274,709

[22] Filed: Jul. 14, 1994

[30] Foreign Application Priority Data

Jul. 15, 1993 [FR] France ................. 93 08665

[51] Int. Cl.⁶ ............................................. F02C 7/18
[52] U.S. Cl. ............................. 60/39.75; 415/115
[58] Field of Search .............. 60/39.75; 415/115, 116, 415/117

[56] References Cited

U.S. PATENT DOCUMENTS

| | | | |
|---|---|---|---|
| 4,462,204 | 7/1984 | Hull | 415/115 |
| 4,807,433 | 2/1989 | Maclin et al. | |
| 4,882,902 | 11/1989 | Reigel et al. | 415/115 |

FOREIGN PATENT DOCUMENTS

| | | |
|---|---|---|
| 0266235 | 5/1988 | European Pat. Off. |
| 0447886 | 9/1991 | European Pat. Off. |
| 2100360 | 12/1982 | United Kingdom |
| 2146113 | 4/1985 | United Kingdom |
| 2225063 | 5/1990 | United Kingdom ........ 415/115 |
| 2246836 | 2/1992 | United Kingdom |

*Primary Examiner*—Louis J. Casaregola
*Attorney, Agent, or Firm*—Oblon, Spivak, McClelland, Maier, & Neustadt

[57] ABSTRACT

A turbojet engine includes a combustion chamber located upstream of a turbine, the turbine having a rotor disk integrally bladed with vanes and including a channel blowing gas from a position outside a wall of the combustion chamber to a peripheral zone of the rotor disk adjacent to the vanes, a channel divided in front of a zone adjacent to the vanes into an internal channel and an external channel surrounding the internal channel, wherein the internal channel has a greater cross-section than the external channel and wherein the external channel converges upon approaching an outlet thereof so as to accelerate the gas flowing therethrough and prevent gas which passed through the internal channel from being dispersed.

6 Claims, 2 Drawing Sheets

TURBO-ENGINE PROVIDED WITH A DEVICE FOR BLOWING AIR ONTO A ROTOR ELEMENT

FIELD OF THE INVENTION

The invention concerns a turbo-engine provided with a device for blowing air onto a rotor element, such as a turbine disk.

BACKGROUND OF THE INVENTION

The ever-increasing performances required for aircraft turbojet engines in particular involve an increase in the ratio between the thrust and the weight.

One possible device to lighten the rotors and increase this ratio consists of using single piece rotor disks, often known as DAMs (monoblock bladed disk) or "BLISK" in English. These disks up until now seem to have been reserved for compressors situated upstream of the combustion chambers as the turbine disks, situated downstream of the combustion chambers, are exposed to excess heatings due to the propulsion gases raised to high temperatures, especially at the peripheral locations of the disks which bear the connections to the stilts of the vanes, and excessive thermic gradients are thus produced in the disks in a radial direction. It is known that fresh air or gas may be taken from another region of the turbo-engine so as to ensure the ventilation of an overheated element, but a problem exists here as the tangential speed of the periphery on cooling a turbine disk is too significant to be able to install a mechanical annular gasket, brush gasket or labyrinth gasket which would cover the gap between this periphery and a fixed ring opposite and from which the ventilation gases would be blown. It is thus necessary to accept a leak of the ventilation gas into the steam of the propulsion gases and a loss of ventilation effectiveness.

SUMMARY OF THE INVENTION

The invention is able to resolve this difficulty and can sufficently cool the peripheral zones of the disks concerned by excess heating, this by using lighter disks consisting of a single block without requiring the use of a device for accelerating the ventilation gas to the ventilated zone, which would reduce the leaks towards the steam but would still adversely affect the effectiveness of ventilation.

The turbo-jet of the invention, which includes a combustion chamber upstream of a turbine partly constituted by a monoblock rotor element provided with vanes and a channel for communicating and blowing gas from the combustion chamber to a peripheral zone of the rotor adjacent to the vanes, the channel being divided in front of the zone adjacent to the vanes into one internal channel and one external channel surrounding the internal channel. The invention is original in that the main portion of the gas passes through the internal channel and in that the external channel is narrowed so as to accelerate the rest of the gas and prevent the gas having passed through the internal channel from being dispersed towards the outside. Most of the flow of the high pressure gases taken from the combustion chamber ensure ventilation flows freely and via the short route of the internal channel towards the turbine monoblock rotor, which renders it unnecessary to use the acceleration device. The confining of the gases outside the propulsion gas circulation steam of the engine is ensured by the portion of gases which pass through the external channel. This device is scarcely compatible with that of the patent GB-A-2 246 836 where the two superimposed channels consist of one external channel with a uniform section ensuring a continuous main flow, and one internal channel blocked off by a valve which only opens at high speeds of the engine so as to provide additional ventilation. In the invention, the two channels are still open.

GB-A-2 100 360 describes in detail how it is possible to establish a disposition so that the ventilation gas blown by a single channel arrives effectively at the disk to be cooled by raising it to a higher pressure or by installing nozzles extending almost as far as the disk.

The internal channel is advantageously occupied by a swirling device for generating a circular velocity to the ventilation gas so as to raise it to a speed close to the tangential speed of the portion of the rotor to be cooled and improve heat exchange via a longer passage of the ventilation gas in the rotor and via a lowering of the overall temperature with respect to the mobile mark integral with the rotor, especially if the latter is provided with openings in which the gas penetrates so as to remain in a recess cut in the zone to be cooled. The effectivensss of heat extraction is then significantly increased.

BRIEF DESCRIPTION OF THE DRAWINGS

There now follows a more detailed illustrative nonrestrictive description of the invention with reference to the accompanying figures on which.

DETAILED DESCRIPTION OF THE PREFERRED EMBODIMENTS

Figure 1:
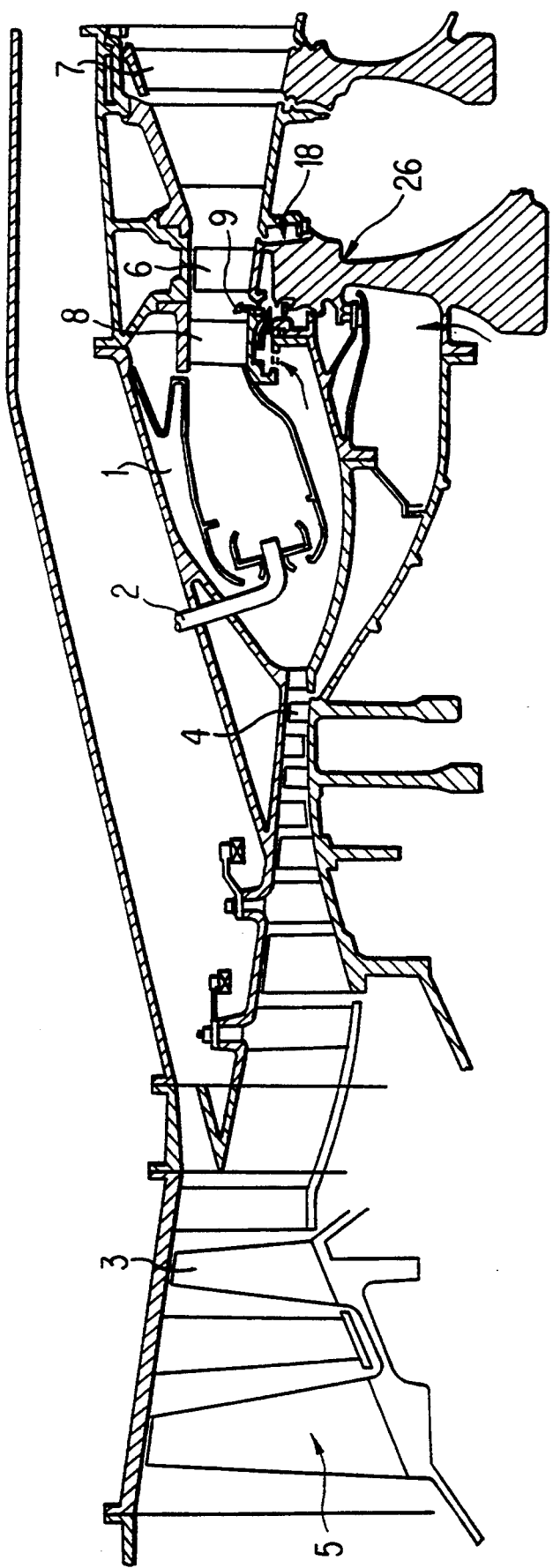
FIG. 1 represents a general structure of a turbojet engine on which the invention can be installed.

FIG. 1 represents a turbojet engine and shows at the center a combustion chamber 1 provided with kerosene injectors 2 and which is fed by the air having traversed a low pressure compressor 3 and a high pressure compressor 4, both compressors occupying two sections of a gas flow steam 5. The propulsion gas flow steam 5 is annular and also extends downstream of the combustion chamber 1 where two of its sections are occupied by a high pressure turbine 6 and a low pressure turbine 7 which drive the compressors 3 and 4 by means of shafts (not shown). Compressors and turbines are formed of disks provided with vanes and are connected to the rotor of the turbojet engine. Moreover, the steam 5 is occupied by stages of fixed distribution or correction vanes which alternate with the stages of vanes of the turbines and compressors. One of these stages belongs to a high pressure distributor 8 situated between the combustion chamber 1 and the high presssure turbine 6.

Figure 2:
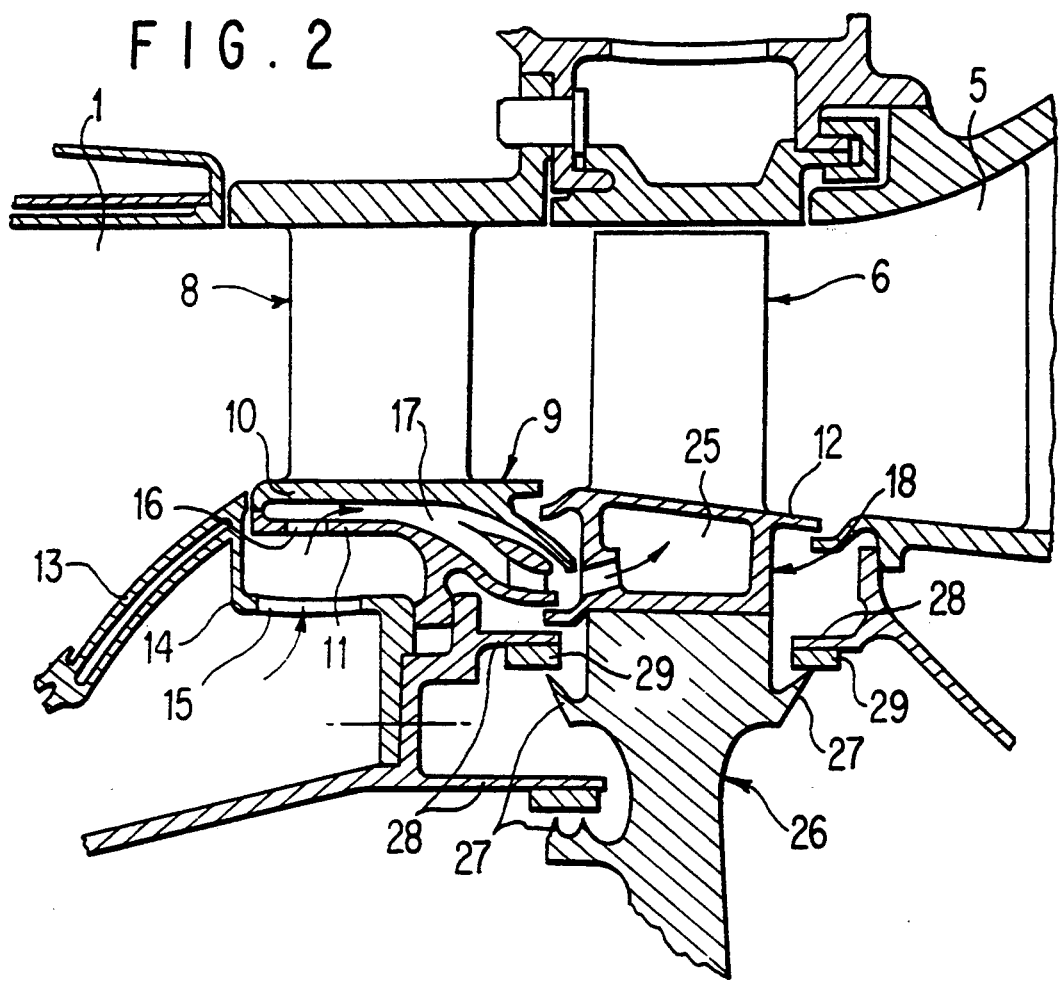
FIG. 2 shows a placing of the invention.

Reference is now made to FIG. 2.

The vanes of the high pressure distributor 8 are combined at their lower ends by a ring 9 which is hollow and whose outer face 10 forms a limit for the steam 5 between one outer face 12 of the disk 26 of the high pressure turbine 6 and a bent inward wall 13 which channels the gases formed in the combustion chamber 1.

The ring 9 has one internal face 11 which is situated opposite an edge 14, orientated like said ring in a radial direction, of the combustion chamber 1. The bent inward wall 13 separates the portion of the combustion chamber 1 delimited by the edge 14 of the latter where the kerosene injectors 2 create the energy contribution to the gases. This portion apart from the kerosene injectors 2 is thus occupied by the relatively fresh air able to ventilate the portions of the machine closest to the steam 5 downstream of the combustion chamber 1 where the combustion gases circulate and are much hotter.

The edge 14 is pierced with recesses 15 in the same way as the lower face 11 pierced with recesses 16 which thus allow fresh ventilation air to flow via its pressure into the recess 17 of the ring 9 in an axial direction downstream and the connection zone 18 of the disk 26 to the vanes, a zone which shall undergo ventilation and cooling, as well as the vanes 6.

Figure 3:
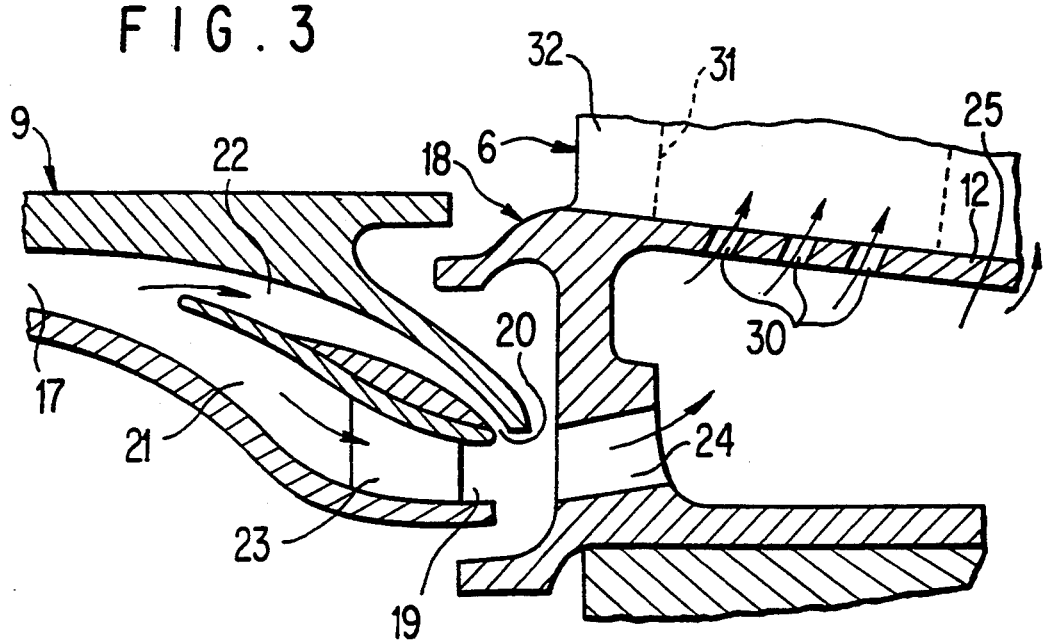
FIG. 3 is an enlarged view of FIG. 2 which represents the invention in more detail.

Reference is now made to FIG. 3. The recess 17 is ended towards the connection zone 18 by one internal opening 19 and one external opening 20, both being annular or at least discontinuous over a circumference and which correspond to the outlets of one internal channel 21 and one outer channel 22 between which the recess 17 is divided on the side of the disk 12. The greatest portion of the ventilation air flows into the internal channel 21 and is accelerated in the direction of rotation of the disk 12 by passing through a swirling device 23 formed of helical plates and occupying one portion of the channel 21. As for the outer channel 22, it is contracted at the opening 20 i.e., can merge when approaching opening 20 so that the air which traverses it (at a weaker flowrate than the internal channel 21 by virtue of a narrower inlet section) leaves it, thus forming a thin sheath at high speed which surrounds the rest of the ventilation air and thus prevents it from dispersing prematurely towards the outside and the flow steam 5. In other words, the dynamic pressure of the air of the outer channel 22 balances the static pressure of the air of the internal channel 21. Almost all the ventilation air is thus blown into openings 24 provided in front of the outlet 19 of the internal channel 21 through the frontal face of the connection zone 18 and flows into a recess 25 of the latter where the ventilation air absorbs one portion of the heat of this peripheral region of the disk 26 before coming out of the recess 25 in the direction of the cavity vanes. Apertures 30 provided through the outer face 12 of the disk 26 allow ventilation air to flow from the recess 25 to the cavities 31 inside the vanes 32 of the turbine 6 which are then also passed through and cooled. The ventilation air finally escapes into the steam 5 and contributes to the propulsion after having fully completed its function as a cooler by virtue of a relatively long stay against the material of the periphery of the disk 26 and the vanes 32.

The disk 26 is provided with "lechettes" 27, that is radial orientation peaks in front of which extend are bearings 28 covered by a soft material 29, often known as a material able to be rubbed in this technique, and which is carved by the rubbing of the "lechettes" 27 so as to merely form with the latter a small amount of play which establishes sufficient imperviousness. Thus, the flow of ventilation is prevented from moving to the axis 34 of the turbojet engine.

This combination of one internal ventilation pipe and one external pipe for creating a gaseous conduit constituting a barrier may be applied to other portions of the turbojet engine.

What is claimed is:

1. Turbojet engine which comprises:
   a combustion chamber located upstream of a turbine, said turbine having a rotor disk integrally bladed with vanes and including a channel blowing gas from a position outside a wall of the combustion chamber to a peripheral zone of the rotor disk adjacent to the vanes,
   a channel divided in front of a zone adjacent to the vanes into an internal channel and an external channel surrounding the internal channel, wherein the internal channel has a greater cross-section than the external channel and wherein the external channel converges upon approaching an outlet thereof so as to accelerate the gas flowing therethrough and prevent gas which has passed through the internal channel from being dispersed.

2. Turbojet engine according to claim 1, which comprises a distributor wherein the turbine is separated from the combustion chamber by said distributor and said distributor includes a ring located opposite a peripheral zone of the rotor and traversed by the communication channel.

3. Turbojet engine according to claim 1, wherein the internal channel is provided with a swirling device swirling the gas so as to have a rotational velocity.

4. Turbojet engine according to claim 3, wherein the peripheral zone is formed with a recess having orifices situated in front of the internal channel.

5. Turbojet engine according to claim 4, wherein the vanes of the rotor have cavities and the recess communicates with the cavities of the vanes of the rotor.

6. Turbojet engine according to claim 1, wherein each of said internal channel and external channel are unobstructed and are continuously open during operation of the turbojet engine.

* * * * *